June 26, 1956    L. A. SAFFORD    2,752,181

GASKET

Filed Dec. 8, 1952

INVENTOR
Lewis A. Safford

BY

ATTORNEYS

United States Patent Office 2,752,181
Patented June 26, 1956

2,752,181

GASKET

Lewis A. Safford, Watertown, N. Y., assignor to The New York Air Brake Company, a corporation of New Jersey Application December 8, 1952, Serial No. 324,652

2 Claims. (Cl. 288—33)

This invention relates to sealing means. Specifically it relates to an improved form of ring gasket of a type which affords a seal between abutting surfaces.

The gasket according to the present invention is of the type in which the pressure of the fluid to be selected against leakage is effective within the gasket to urge the gasket into sealing engagement with the abutting surfaces.

The gasket comprises a ring having an outer, thin shell of resilient material such as synthetic rubber or other suitable plastic material. The outer shell is of channel shape, the open face of the channel facing the source of the leakage fluid. The channel is filled with a porous plastic material such as sponge rubber. The thin shell is of a thickness such that it is not self-sustaining, and the porous filling is afforded to sustain the channel form of the shell at those times when no pressure is effective in the channel.

The rather extreme thinness of the outer shell enables the gasket to provide an effective seal even though the abutting surfaces with which it coacts are relatively rough.

The preferred embodiment of the invention will be described having reference to the accompanying drawing in which.

Figure 1:
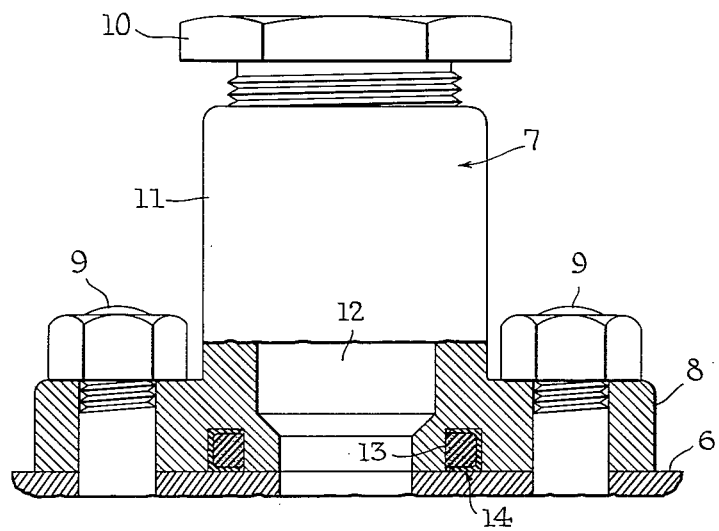
Figure 1 is an elevation partly in axial section of a pipe fitting which includes the invention.

Refer first to Figure 1. Reference numeral 6 indicates a portion of a pipe bracket or the like to which the fitting 7 is attached. The fitting 7 includes a mounting flange 8 secured to the face of the bracket 6 by bolts 9. The body 11 of the fitting 7 includes a bore 12 which receives a pipe, not shown. The body 11 encloses a suitable packing not shown and receives a packing gland nut 10 in the outer end of bore 12. The mounting face of flange 8 is provided with a groove 13 in which the ring gasket 14 is received.

Figure 2:
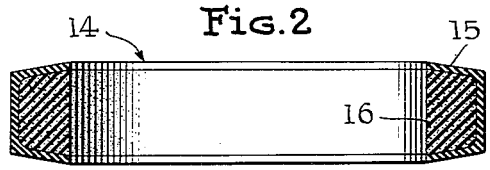
Figure 2 is an axial section of the improved gasket.
Figure 3:
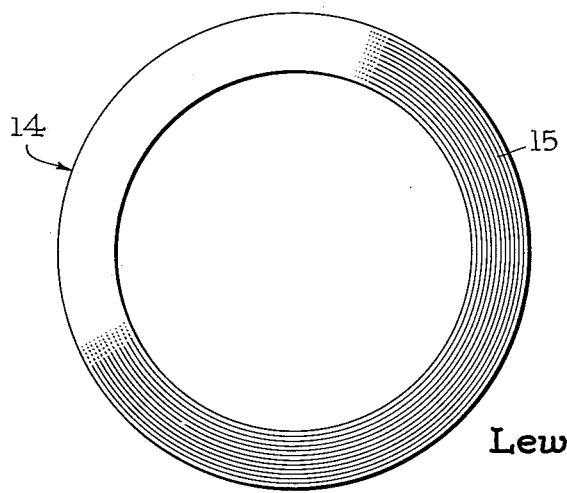
Figure 3 is a plan view of the gasket.

Referring to Figures 2 and 3 the ring gasket 14 includes an outer shell 15 of thin resilient material. This shell is channel shaped. A filler 16 of porous material fills the thin shell 15 and is preferably bonded thereto. It will be noted that the upper and lower surfaces of the shell 15 are conical and diverge from the web portion of the channel. The radial thickness of the gasket 14 when uncompressed is slightly less than the radial dimension of the groove 13. The outer diameter of the gasket 14 corresponds to the outer diameter of groove 13.

Before the flange 8 is bolted to the face of bracket 6 the gasket 14 is inserted into the groove 13. When the bolts 9 are tightened the conical faces of gasket 14 are flattened and engage the bottom of the groove 13 and the face of the bracket 6. The resilient filler 16 biases the upper and lower faces into sealing relationship against these surfaces. When pressure fluid is admitted to the bore 12, it will flow outward between the bracket 6 and the flange 8. Because the outer shell 15 is already lightly biased into engagement with these faces the pressure fluid will flow into the porous filler 16 and act therein to bias the shell 15 against the surfaces of groove 13 and bracket 6.

It will be seen that the improved gasket may be made with a thin shell 15 which would not be self-sustaining. Hence the shell is easily deformed to seal against leakage even though the surfaces of the groove 13 and bracket 6 are rough or irregular.

It will be apparent that the gasket could be used to afford a seal against fluid flowing in the reverse direction. In any case the exposed face of the porous core or filler is exposed toward leakage fluid.

In the appended claims the words "ring gasket" are used in a broad generic sense to denote an endless gasket which encompasses an area to be sealed. The periphery of this need not be circular.

What is claimed is:

1. An endless gasket to be mounted in a gasket-confining space defined between two mating surfaces fixed relatively to one another, said gasket comprising an endless, impervious, pellicular shell of resilient plastic material, said shell having a generally U-shaped cross-section; and a core of cellular resilient plastic material, all but a minor portion of the external surface of the core being encased by said shell.

2. An annular gasket for mounting in a confining groove fromed in one of two mating surfaces, said gasket comprising an annulus of cellular, resilient plastic material substantially quadrilateral in cross-section so as to have two generally conoidal surfaces and two generally cylindrical surfaces, and a continuous, pellicular shell of impervious, resilient plastic material sustained by three of the four surfaces, namely the two conoidal surfaces and one only of the cylindrical surfaces.

References Cited in the file of this patent

UNITED STATES PATENTS

| | | |
|---|---|---|
| 160,731 | Taylor | Mar. 9, 1875 |
| 1,204,007 | Goodsell | Nov. 7, 1916 |
| 1,541,601 | Tribe | June 9, 1925 |
| 1,931,922 | Damsel et al. | Oct. 24, 1933 |
| 2,205,910 | Rayboud | June 25, 1940 |
| 2,275,235 | Shanklin et al. | Mar. 3, 1942 |
| 2,354,270 | Marco | July 25, 1944 |